United States Patent

[11] 3,624,819

[72] Inventor Robert A. Schickling
 346 Avon Raod, Philadelphia, Pa. 19116
[21] Appl. No. 15,123
[22] Filed Feb. 27, 1970
[45] Patented Nov. 30, 1971

[54] VARIABLE RADIUS SUPPORT TABLE
 6 Claims, 9 Drawing Figs.
[52] U.S. Cl. ................................................ 408/92,
 408/19, 83/648, 90/58
[51] Int. Cl. ...................................................... B23b 41/00
[50] Field of Search ............................................ 408/19, 87,
 89, 92; 83/648; 90/58

[56] References Cited
UNITED STATES PATENTS
847,908 3/1907 Collins ......................... 408/19

Primary Examiner—Francis S. Husar
Attorney—Howson and Howson

ABSTRACT: A variable radius support table for apparatus for performing machining operations comprising a main frame including a fixed support member, a flexible work support plate engaging said fixed support member and actuating means for flexing said work support plate relative to said fixed support member to selectively vary the curvature of said work support plate.

PATENTED NOV 30 1971 3,624,819
SHEET 1 OF 2
FIG.1.
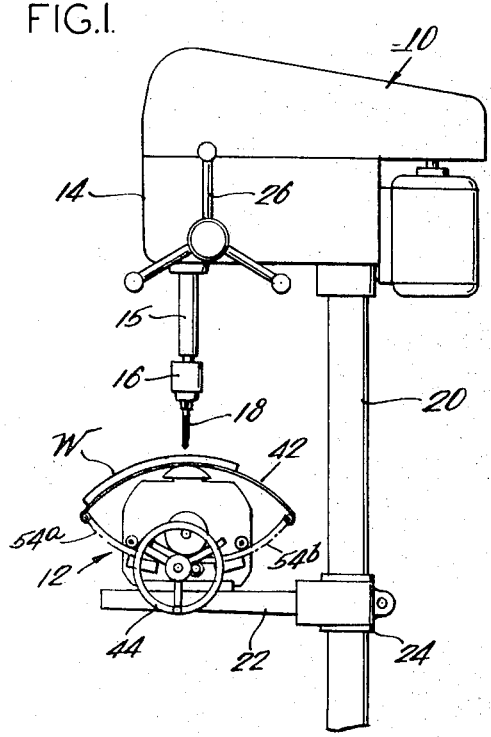
FIG.6.
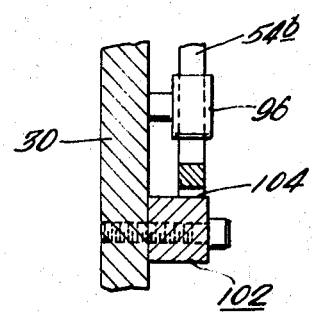
FIG.7.
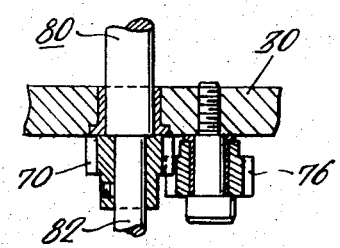
FIG.8.
FIG.4.
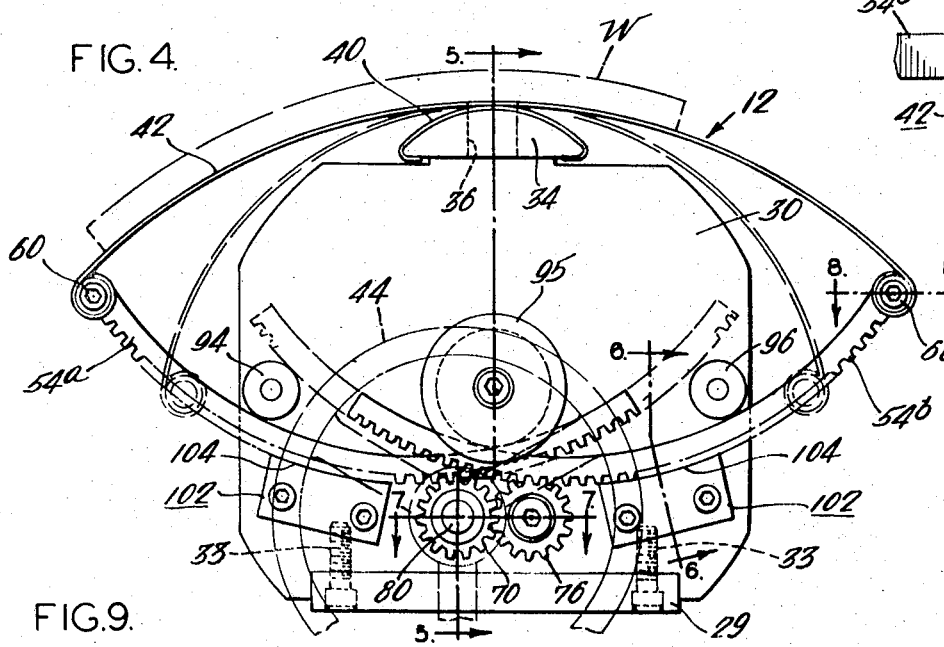
FIG.9.
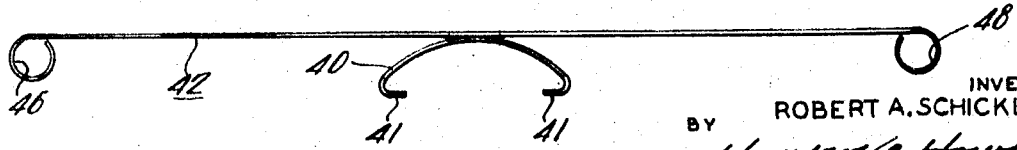
INVENTOR:
ROBERT A. SCHICKLING
BY Howson & Howson
ATTYS.

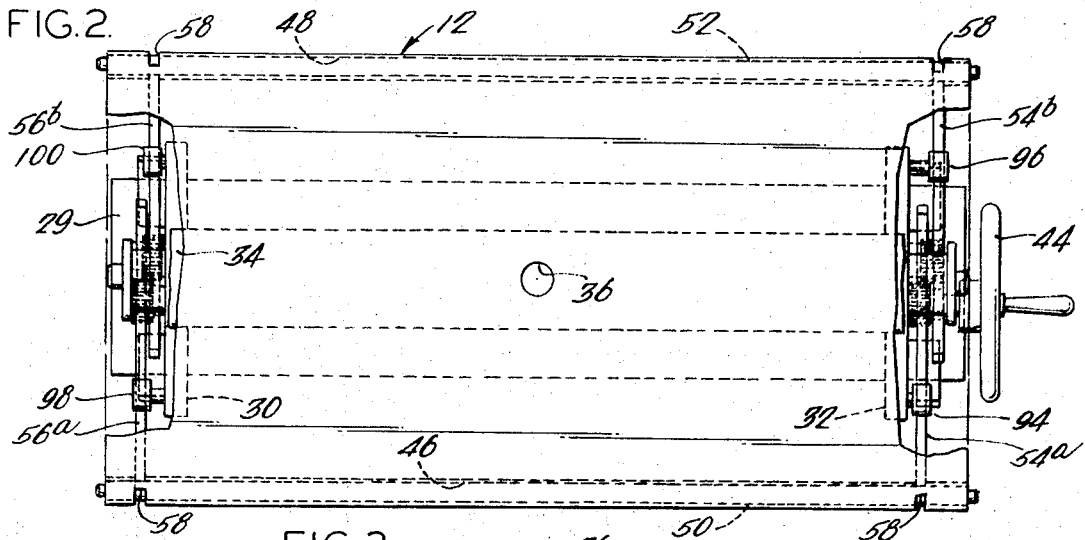
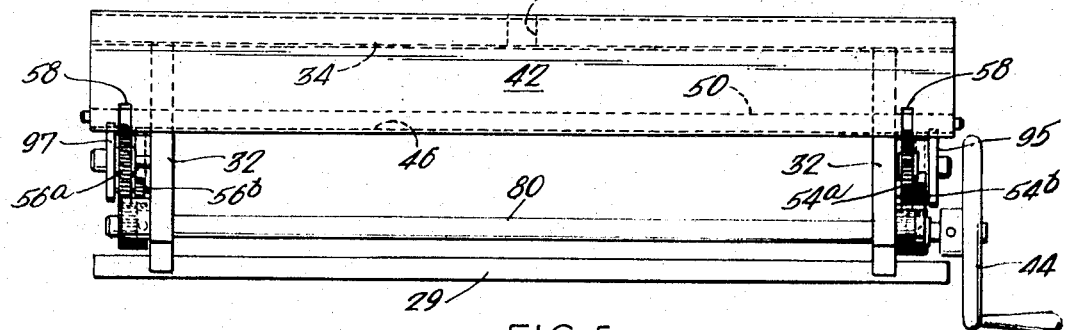
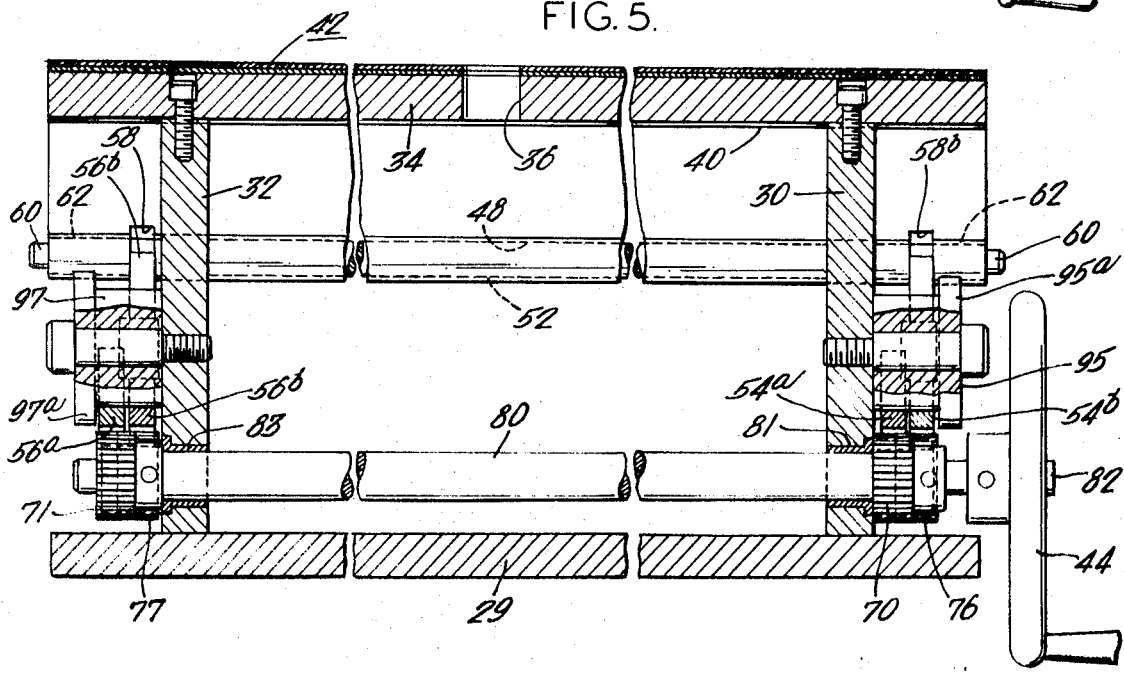
INVENTOR:
ROBERT A. SCHICKLING
BY Howson & Howson
ATTYS.

VARIABLE RADIUS SUPPORT TABLE

The present invention relates broadly to apparatus for performing machining operations and more specifically to a novel support table for an apparatus of this type.

The invention is suitable for use in drilling machines and is particularly suited for use in drilling workpieces having arcuate or curved surfaces. At present, these drilling apparatus generally comprise a drilling head mounted at one end of an upstanding column which in turn mounts an adjustable frame or table on which the workpiece to be drilled is supported. In the case of arcuate workpieces, backup cylinders have been used which are shaped and sized to the piece being drilled and which in turn are secured by the operator in a predetermined location on the support table. These backup cylinders, while they are generally suitable for the purpose intended, nevertheless require time to remove and replace which of course adds to the cost of the drilling operation. Furthermore, if the cylinders are damaged, they are no longer suitable for use and there is the added expense of replacing these cylinders.

The present invention provides a support table for machines of this type which is particularly designed for supporting workpieces having curved or arcuate configuration. An important feature of the present invention is the fact that the supporting surface of the table is selectively adjustable to various arcuate configurations so that the same table may be effectively used with workpieces having different curved configurations. By the present invention a single support serves a plurality of purposes and thereby eliminates the cost of storing various type fixtures for a range of workpieces such as the cylinders noted above. Additionally, the main portion of the support table may be easily removed and replaced in the event that it is damaged. This contrasts with the prior arrangements where the entire cylinder had to be replaced.

With the foregoing in mind, it is apparent the present invention provides a novel improvement in support structures for machining operations which is of comparatively simplified construction and is truly effective for supporting curved workpieces of varying configuration.

These and other objects of the present invention and various features and details of the operation and construction thereof are hereinafter more fully set forth with reference to the accompanying drawings, wherein;

FIG. 1 is a side-elevational view of a drilling apparatus incorporating a variable radius support table constructed in accordance with the present invention;

FIG. 2 is a plan view of the support table with portions broken away so that the construction thereof may be seen more clearly;

FIG. 3 is a side-elevational view of the support table of the present invention;

FIG. 4 is an enlarged end view of the support table;

FIG. 5—8 inclusive are enlarged sectional views taken on lines 5—5, 6—6, 7—7 and 8—8 respectively of FIG. 4; and FIG. 9 is an end view of the support plate in an unrestrained or fully extended position.

Referring now to the drawings and particularly to FIG. 1 thereof, there is illustrated a conventional drilling apparatus generally designated by the numeral 10 incorporating a variable radius support table 12 constructed in accordance with the present invention. These drilling apparatus generally comprise a drilling head 14 having a rotatable spindle 15 and chuck 16 for supporting a drill or tapping tool 18, the entire assembly being mounted on a vertical column 20 supported on a base (not shown). The table 12 is supported on the press table 22 which is conventionally mounted on a collar 24 adjustable longitudinally of the column 20. The drill assembly includes the usual handle actuating member 26 for reciprocating the drilling tool in a vertical direction to engage and retract the tool from the workpiece W.

The support table of the present invention comprises a generally rectangular base 29 which may be secured to the frame 22 in a suitable manner, a pair of spaced apart upstanding end support plates 30 and 32 secured to the base by fastening screws 33 supporting at their upper terminal ends a cross piece 34 having an opening 36 therein for receiving the drilling tool. The crosspiece supports a shield 40 having an arcuate configuration and reversely inwardly bent side flanges 41 which engage under the crosspiece as illustrated. By this construction the shield 40 may be slipped onto the cross piece from either end. A larger work support plate 42 preferably made of steel of a gauge so that it may be bent is supported over the shield 40 and is adapted to be flexed to various positions (see FIG. 4) so that its outer contour may be selectively varied to conform to the workpiece and firmly support the workpiece in a position to be drilled. Note that the shield 40 and work support plate 42 have openings which register with the opening 36 in the cross piece 34.

Means is provided for selectively varying the curvature of the work support plate 42. As more clearly illustrated in FIGS. 4–9 inclusive, the actuating means comprises paired rack and pinion arrangements actuatable by a hand wheel 44. More specifically, the outer side edges of the flexible work support plate are turned under to form a circular chambers 46 and 48 for receiving a pair of stiffening rods 50 and 52. Adjacent opposite ends of each of the rods is mounted a curved toothed rack 54a, 54b, and 56a, 56b. Slotted openings 58 provided in the plate 42 permit access to the terminal ends of the rods 50 and 52 for pivotal attachment thereto of the hub ends of the several rack members by means of screws 60 (see FIG. 8). Sleeves 62 fitted into the chambers 46 and 48 at their terminal ends adjacent the side edges of plate 42 serve as filler members to supplement the stiffening rods 50 and 52. The racks 54a, 56a mounted on one side edge of the flexible work support plate mesh with gears 70 and 71 and the racks 54b, 56b mounted on the opposite side edge of the flexible table mesh with rotatable gears 76 and 77. The gears 70 and 71 are mounted at opposite ends of a shaft 80 rotatably journaled in bearing sleeves 81 and 83 in the opposed end support plates 30 and 32. The shaft has an extension as at 82 which carries the hand wheel 44 for rotating the shaft and gears. The gear wheels 70 and 71 are the drive gears and mesh respectively with gears 76 and 77 mounted on the opposed end support plates 30 and 32. By this arrangement, when the hand wheel 44 is rotated for example in a clockwise direction with respect to FIG. 4, the drive gears 70 and 71 are rotated in a clockwise direction to in turn actuate the racks 54a and 56a inwardly. Simultaneously, because of the intermeshing relation between the drive gears and the driven gears 76 and 77, these gears are rotated in a counterclockwise direction to effect inward displacement of the racks 54b and 56b, and in turn flex the work support table to reduce the radius of curvature. By this arrangement, the curvature of the table about the shield 40 is uniform. Of course, rotation of the hand wheel 44 in the opposite direction effects outward displacement of the racks on both sides to increase the radius of curvature of the work support table. The racks are maintained in meshing relation with the respective gear wheel elements by rollers 94, 96, 98 and 100 which are rotatably supported on opposed end walls of the frame and engage the untoothed edge of the racks. A pair of rotatable discs 95 and 97 are mounted on the outer face of the end support members 30 and 32 adjacent the area where the racks mesh with the drive gears to insure positive engagement. Each disc has a stepped configuration to define a flange 95a, 97a confining the racks against sidewise displacement. The apparatus further includes a plurality of bearing or guide shoes 102 mounted on the outer face of the end support plates 30 and 32. Each of these guide shoes 102 has an arcuate face 104 conforming the curved path of movement of the racks to provide further guide means for the racks.

In operation, therefore, when it is desired to drill or tap a workpiece at various locations, the stand 22 is simply positioned at the proper height initially and thereafter the operator adjusts the curvature of the flexible work support table 40 by rotation of the hand wheel 44 in, for example, a clockwise direction to increase the curvature of the plate or in a counterclockwise direction to decrease the same. The operator makes this adjustment until the table conforms to the curvature of the workpiece W. At his point, the machine is set to drill the workpiece and the workpiece then is simply moved from one position to another along the support plate if it is being drilled in a plurality of locations. It is apparent that the present invention obviates the need for fixtures in the form of backup cylinders and reduces considerably the amount of set up time required to provide a precise support for the workpiece. Additionally, since the rack and gear arrangement provides for very minute adjustments of the table, a more precise support is provided for the workpiece as compared with prior cylinder-type cylinders discussed above. Additionally, it is clear that if the flexible work support plate is damaged, it is easy to replace.

I claim:

1. A variable radius support support table for apparatus for performing machining operations comprising a main frame including a fixed support member, a flexible work support plate engaging said fixed support member and actuating means for flexing said work support plate relative to said fixed support member to selectively vary the curvature of said work support plate.

2. A variable radius support table as claimed in claim 1 including means defining an opening in said work support plate and said fixed support member for receiving a tool of the machining apparatus.

3. A variable radius support table as claimed in claim 1 wherein said actuating means comprises a rack and pinion arrangement.

4. A variable radius support table as claimed in claim 1 wherein said actuating means includes at least one arcuate toothed rack connected to each side edge of said work support plate, and a system of drive and driven gears rotatably mounted in said frame in meshing relation with said racks, rotation of said drive gear in one direction operable to effect a decrease in the radius of curvature of said work support plate and rotation of said drive gear in an opposite direction operable to increase the radius of curvature of said support plate.

5. A variable radius support table as claimed in claim 4 including guide means mounted in said frame and engaging said racks to guide the same and maintain the racks in meshing relation with said gears.

6. A variable radius support table as claimed in claim 4 wherein said rack mounted on one edge of said work support table meshes with said drive gear and the other rack meshes with said driven gear.

* * * * *